(12) United States Patent
Seidler et al.

(10) Patent No.: US 11,597,524 B2
(45) Date of Patent: Mar. 7, 2023

(54) HEATING DEVICE AND METHOD FOR MANUFACTURING SAME

(71) Applicant: JENOPTIK ADVANCED SYSTEMS GMBH, Wedel (DE)

(72) Inventors: Klaus Seidler, Uetersen (DE); Ulf-Dieter Ulken, Seevetal-Horst (DE)

(73) Assignee: Jenoptik Advanced Systems GmbH, Wedel (DE)

( * ) Notice: Subject to any disclaimer, the term of this patent is extended or adjusted under 35 U.S.C. 154(b) by 1013 days.

(21) Appl. No.: 16/097,433

(22) PCT Filed: Apr. 28, 2017

(86) PCT No.: PCT/EP2017/060156
§ 371 (c)(1),
(2) Date: Oct. 29, 2018

(87) PCT Pub. No.: WO2017/186895
PCT Pub. Date: Nov. 2, 2017

(65) Prior Publication Data
US 2019/0135442 A1    May 9, 2019

(30) Foreign Application Priority Data

Apr. 28, 2016 (DE) .......................... 102016107908.1

(51) Int. Cl.
*B64D 13/08* (2006.01)
*F24D 13/02* (2006.01)
*H05B 3/26* (2006.01)

(52) U.S. Cl.
CPC ........... *B64D 13/08* (2013.01); *F24D 13/024* (2013.01); *H05B 3/267* (2013.01);
(Continued)

(58) Field of Classification Search
CPC ..... B64D 13/024; F24D 13/024; H05B 3/267; H05B 2203/003; H05B 2203/006;
(Continued)

(56) References Cited

U.S. PATENT DOCUMENTS 3,697,728 A    1/1972  Stirzenbecher
4,518,851 A *  5/1985  Oppitz .................. H05B 3/34
                                                  219/528
(Continued)

FOREIGN PATENT DOCUMENTS

CA    2662658 A1 * 10/2009 ............... B64C 1/18
CN    202190419 U     4/2012
(Continued)

OTHER PUBLICATIONS

Chinese Office Action dated Oct. 20, 2020 in corresponding application 201780025119.6.
(Continued)

*Primary Examiner* — Tu B Hoang
*Assistant Examiner* — Alba T Rosario-Aponte
(74) *Attorney, Agent, or Firm* — Muncy, Geissler, Olds & Lowe, P.C.

(57) ABSTRACT

The present invention relates to a heating device for an aircraft interior. The heating device has a mechanically loadable support structure, a mechanically loadable and thermally conductive outer structure, and a heater for converting electrical energy into thermal energy, wherein the heater is arranged between the support structure and the outer structure and has a heating layer composed of a resistance material with a positive temperature coefficient.

14 Claims, 4 Drawing Sheets

(52) U.S. Cl.
CPC .. *H05B 2203/003* (2013.01); *H05B 2203/006* (2013.01); *H05B 2203/013* (2013.01); *H05B 2203/017* (2013.01); *H05B 2203/02* (2013.01); *H05B 2203/026* (2013.01); *Y02B 30/00* (2013.01)

(58) Field of Classification Search
CPC ........ H05B 2203/013; H05B 2203/017; H05B 2203/02; H05B 2203/026
USPC ...... 392/435; 219/200, 201, 202; 244/118.5, 244/117 R
See application file for complete search history.

(56) References Cited

U.S. PATENT DOCUMENTS

| | | | |
|---|---|---|---|
| 4,645,913 A | | 2/1987 | Oppitz |
| 9,004,407 B2 * | | 4/2015 | Calder .................. B64D 15/12 |
| | | | 219/202 |
| 9,914,522 B2 | | 3/2018 | Nehring |
| 2002/0168184 A1 | | 11/2002 | Meisiek |
| 2006/0138279 A1 * | | 6/2006 | Pisarski .................... B64C 1/18 |
| | | | 244/118.5 |
| 2007/0210073 A1 * | | 9/2007 | Hubert .................. B64D 15/12 |
| | | | 219/535 |
| 2007/0224406 A1 * | | 9/2007 | Busch ..................... B32B 29/02 |
| | | | 428/292.1 |
| 2015/0375657 A1 * | | 12/2015 | Braun .................. B60N 2/5685 |
| | | | 219/202 |
| 2016/0121993 A1 * | | 5/2016 | Nehring .................. H05B 3/34 |
| | | | 244/118.5 |

FOREIGN PATENT DOCUMENTS

| | | |
|---|---|---|
| DE | 102005058241 A1 | 9/2006 |
| DE | 10201500594583 | 8/2016 |
| EP | 0109019 A2 | 5/1984 |
| EP | 3015360 A1 | 5/2016 |

OTHER PUBLICATIONS

International Search Report dated Jul. 13, 2017 in corresponding application PCT/EP2017/060156.
International Preliminary Report on Patentability dated Nov. 8, 2018 in corresponding application PCT/EP2017/060156.

* cited by examiner

HEATING DEVICE AND METHOD FOR MANUFACTURING SAME

This application is a National Stage of International Application No. PCT/EP2017/060156, filed on Apr. 28, 2017, which claims priority to Application No. DE 102016107908.1 filed in Germany on Apr. 28, 2016, the entire contents of all of which are hereby incorporated by reference.

BACKGROUND OF THE DISCLOSURE

Field of the Disclosure

The invention relates to a device or a method according to the preamble of the independent claims.

Description of the Background Art

With heatable floor panels for an aircraft interior, as a heating element, a resistance heating wire is adhesively bonded to a normal floor panel and covered by a thermally conductive film in order to distribute the heat. These heatable floor panels consist of a sandwich structure composed of a fiber composite and a honeycomb core, to which structure a heating element composed of heating wires is adhesively bonded. Above the heating element, a protective layer and, lastly, a titanium film is applied, to which coverings such as carpet or the like can be reversibly adhesively bonded. In this arrangement, malfunctions can arise due to mechanical damage or infiltrating moisture.

US 2002 0168 184 describes the construction of a heated floor panel.

SUMMARY OF THE DISCLOSURE

Against this background, with the approach that is proposed here, a heating device and a method for producing a heating device are presented. Advantageous refinements and improvements of the device specified in the independent claim are possible by way of the measures set out in the dependent claims.

The use of a heating layer composed of a resistance material with a positive temperature coefficient, a so-called cold conductor or PTC resistor (PTC: positive temperature coefficient) allows for example the realization of a floor panel which is able to be used for an aircraft interior and which exhibits good mechanical and electrical properties. In particular, it is possible for the heating layer to be designed to be relatively insensitive with respect to mechanical damage and fail-safe with respect to overheating. In this way, a high level of operational reliability and failure safety can be achieved.

A heating device for an aircraft interior has the following features:

a mechanically loadable support structure;

a mechanically loadable and thermally conductive outer structure; and a heater for converting electrical energy into thermal energy, wherein the heater is arranged between the support structure and the outer structure and has a heating layer composed of a resistance material with a positive temperature coefficient.

Merely by way of example, a surface of the outer structure may be formed as a tread surface of a floor panel. Consequently, the approach described can be advantageously used for realizing a heatable floor panel. The outer structure may have a surface which is able to be adhesively bonded to, in order, for example, to adhesively bond a carpet covering thereto. Preferably, said surface may be modified to the extent that it is formed to be resistant to cutting and ripping, in order to withstand a repeated replacement of, for example, carpet coverings, with tools such as cutters or the like being used.

A support structure can be understood as meaning a laminate which has a high stiffness. In particular, the support structure may have a sandwich construction composed of fiber-reinforced outer layers and a lightweight core material arranged therebetween. The support structure may be formed in a panel-like manner. The support structure may be thermally insulating. The support structure primarily serves as an insulating structure but, at the place where it is applied, is to be understood as being part of the supporting overall arrangement. The core material may for example be a rigid foam or a honeycomb material. The outer structure may be formed in a panel-like manner. The outer structure may have a sandwich construction. If an electric current flows through the resistance material, then it warms up on the basis of its electrical resistance. For this purpose, the heater may have electrical contacts between which the resistance material is arranged. The resistance material may be formed as a planar layer. The positive temperature coefficient causes the electrical resistance of the resistance material to increase when the temperature of the resistance material increases. Consequently, a power consumption is limited in a self-regulating manner, and an electronic temperature regulating means or power limitation means may be dispensed with. Advantageously, owing to its positive temperature coefficient, the resistance material provides overheating protection, and so an additional temperature sensor may be dispensed with.

The outer layer may be designed to be insensitive with respect to mechanical effects, as normally occur in the surroundings of the heating device. The outer structure prevents the heater from becoming accessible to environmental influences and being damaged for example by corrosion. Also, the outer structure can prevent a wire of the heater, for example, from being damaged or severed. The heater can thus be protected against failure by the outer structure. The outer structure may perform the function of a protective panel. In order to be able to transport the heat to the surface of the outer structure, the outer structure is equipped with regard to thermal conduction. Due to the outer structure, the heating element is securely protected against mechanical effects and environmental influences. It is consequently possible for a long service life of the heating device, for example in the form of a floor panel, to be achieved. The outer structure serves as a supporting structure of the panel over the entire contour of the panel.

The outer structure may be a laminate composed of a core between two outer layers. The core may be a honeycomb core composed of a metal material. A laminate with a honeycomb core has a low weight and at the same time a high stiffness. A metal material has a low thermal resistance. As a result of the metallic honeycomb core, it is possible to achieve high stiffness in combination with good thermal conductivity. In an alternative embodiment, the core may be a honeycomb core composed of a non-metallic material. Good thermal conductivity between the two outer layers can be achieved in that the cell walls of the honeycomb core are adhesively bonded using a thermally conductive adhesive which is enriched with silver and/or other particles which improve heat conduction.

A surface of the honeycomb core may have protection against corrosion. For example, the surface may be anodized or protected against corrosion in some other suitable manner. It is possible in particular by way of anodizing to achieve effective protection against corrosion such that, even in the event of damage of an outer layer, weakening of the outer structure is prevented. Moreover, the metallic core may be arranged such that it is not in direct electrically conductive contact with a corrosion partner according to an electronegativity potential.

The core may also be composed of a thermally insulating material. Here, the outer layers may be connected through the core by thermally conductive thermal bridges. The core may be composed for example of a rigid foam. The rigid foam can be processed easily. Thermal bridges may connect one outer layer to the other outer layer. The thermal bridges may at least have a metal material content. The thermal bridges may also completely consist of metal material. The thermal bridges may be introduced into the core material at a later stage. The thermal bridges may also be foam-encapsulated by the core material. The outer layers may be formed by means of an epoxy resin which has been upgraded for thermal conduction by mineral additivation. The thermal bridges may also be surrounded by a matrix resin which has been upgraded for thermal conduction by mineral additivation. Such wetting additionally has the effect of protection against corrosion at possibly metallic threads.

According to one embodiment, the thermal bridges may be realized by at least one thread sewn into the core. The at least one thread may consist at least partially of metal. Sections of the thread which are sewn into the core may extend through the entire thickness of the core. The sewing-in allows the thermal bridges to be produced very easily. The threads are, according to one embodiment, wetted by the matrix in an infusion process and thereby also protected against corrosion. In this way, the thermal bridges may additionally be realized by modified matrix material.

The outer layers may be connected directly to one another in a peripheral edge region. A direct connection allows a sealed closure to be achieved. The outer structure may thus be hermetically sealed. Infiltration of moisture can be reliably prevented.

The heater may be connected to the support structure and alternatively or additionally to the outer structure through the use of an elastic or slide-plane material. The elastic material allows a movement of the heating layer with respect to the support structure and/or the outer structure, which movement is brought about by thermal expansion of the heating layer. In a corresponding manner, the slide-plane material allows such a movement in that it allows the heating layer to slide on a surface of the slide-plane material.

The support structure and the outer structure may be connected to one another at least sectionally in an edge region. The heating layer may be arranged in a floating manner between the support structure and the outer structure. A floating arrangement allows thermal expansion of the heating layer independently of the support structure and the outer structure.

The heating layer may be enclosed in a fluid-tight manner between the support structure and the outer structure. In this way, the heating layer can be protected against damage caused by infiltrating moisture.

The heating layer may be a layer applied from a liquid or spreadable resistance material to the support structure or the outer structure. In this way, greater flexibility of the heating layer can be achieved.

In a further embodiment, the heating layer may have perforations at least regionally. As a result of the perforation of the heating layer, cavities are able be provided between the support structure and the outer structure. Said cavities may be filled with a material. The material may be a curing adhesive. Such an arrangement allows mechanical decoupling between the heating layer and the remaining static parts, that is to say the support structure and the outer structure. Such an arrangement is advantageous in particular if the heating layer is not able to pass on forces.

Redundant contacting is possible for the heating layer of the heater. Redundant contacting may be formed by way of a multiple connection between an electrical connection and the heater. Also, it is possible to provide multiple lines to multiple connections. Due to the redundant contacting, the heater may still be reliably operated even if one or more lines are interrupted due to for example mechanical or chemical effects.

A first electrical connection of the heating layer and a second electrical connection of the heating layer may be formed as interdigital electrodes. The interdigital electrodes may comprise a plurality of conductor tracks which engage into one another. Interdigital electrodes may be designed as comb-shaped conductor tracks which engage into one another. Both electrodes may be arranged on the same surface of the resistance material. Interdigital electrodes can be produced easily. For example, the interdigital electrodes may be formed by a printed film. Also, the interdigital electrodes may be applied to, or printed on, the resistance material directly. Advantageously, an interruption of a conductor path of one of the interdigital electrodes has only a small influence on the overall function of the heating device.

Furthermore, a method for producing a heating device for an aircraft interior is proposed, wherein the method has the following steps:

provision of a mechanically loadable support structure and a mechanically loadable and thermally conductive outer structure; and arrangement of a heater, serving for converting electrical energy into thermal energy, between the support structure and the outer structure, wherein the heater has a heating layer composed of a resistance material with a positive temperature coefficient.

BRIEF DESCRIPTION OF THE DRAWINGS

Exemplary embodiments of the approach proposed here are illustrated in the drawings and are explained in more detail in the following description. In the drawings:

FIG. 5b shows a partial sectional illustration of a floor panel with a heating device according to FIG. 5a;

DETAILED DESCRIPTION

In the following description of expedient exemplary embodiments of the present invention, identical or similar reference signs are used for the elements of similar action which are illustrated in the various figures, wherein a repeated description of such elements is omitted.

Figure 1:
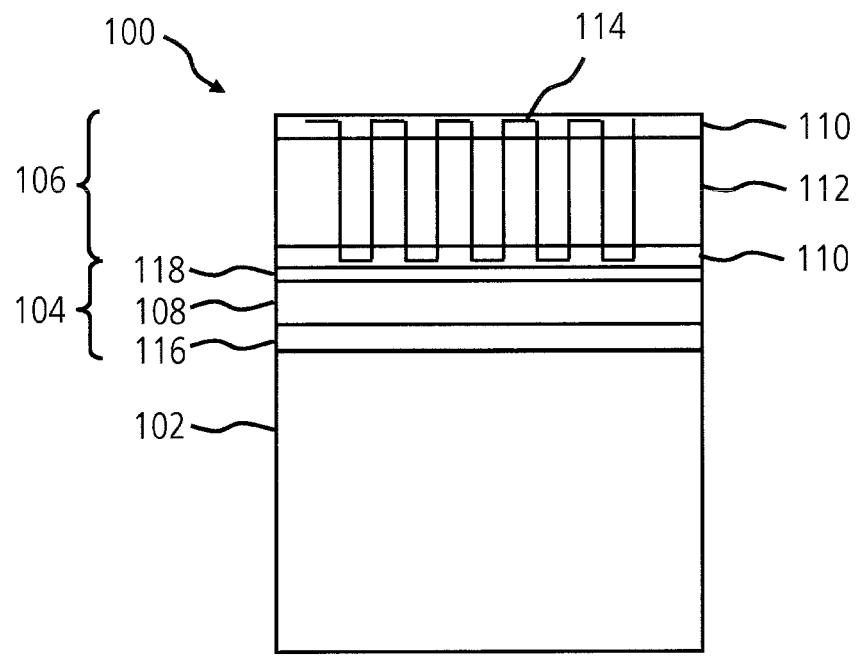
FIG. 1 shows a schematic illustration of a heating device according to one exemplary embodiment.

FIG. 1 shows a purely schematic illustration of a heating device 100 according to one exemplary embodiment. In this case, a general panel construction of the heating device 100 is shown. The heating device 100 is, according to one exemplary embodiment, designed as a floor panel, for example for a passenger compartment of an aircraft, or able to be integrated into such a floor panel.

The heating device 100 has a sandwich construction composed of different layers. Arranged on a support structure 102 is a heater 104, and arranged on the latter is an outer structure 106. Hereinafter, the heater 104 will also be referred to as a heating device or heating element. The support structure 102 is mechanically loadable, that is to say of a flexurally rigid design and, according to this exemplary embodiment, designed to transmit a load, which bears on the heating device 100, to bearing points arranged on the edge of the heating device 100. The heater 104 comprises a heating layer which is composed of a resistance material 108 which warms up when an electrical current flows through the material. The heater 104 is thus designed to convert electrical energy into thermal energy. The outer structure 106 is likewise mechanically loadable. The outer structure 106 is at least designed to distribute load peaks, arising due to the load, over a surface of the heater 104 in order to protect the heater 104 against mechanical damage. In order to be able to dissipate the heat produced by the heater 104, the outer structure 106 is also thermally conductive.

In one exemplary embodiment, the outer structure 106 is designed as a laminate composed of two outer layers 110 and a thermally conductive core 112. The core 112 is in this case a honeycomb structure composed of a metal material. Here, owing to its low thermal resistance, a high content of aluminum in the metal material is advantageous. The outer layers 110 may likewise be composed of the metal material.

In one exemplary embodiment, the thermal conduction is realized through an aluminum honeycomb 112 directly above the heater 104. Aluminum conducts the heat extremely well.

In order to avoid problems with corrosion, in case moisture infiltrates into the honeycomb as a result of damage or diffusion effects, the surface of the aluminum honeycomb 112 is, in one embodiment, preferably protected by a specific conversion in an anodizing process, with which corrosion is ruled out even if moisture infiltrates. During the operation of the heater, this moisture which infiltrated by way of diffusion processes would be expelled from the plate again, likewise by way of diffusion.

According to one exemplary embodiment, special upgrading of the outer laminate, as well as of the sandwich structure 106, for thermal conduction is realized, for example through the use of thermally conductive material. Such upgrading is necessary because laminates composed of carbon fibers, aramide fibers or glass fibers and epoxy resins, and also in particular the thick sandwich structures, suitable per se for outer layers 110, with honeycomb cores or foams, insulate the heat rather than conduct it.

In one exemplary embodiment, the outer structure 106 is designed as a sandwich composed of two outer layer laminates 110 and a thermally insulating core 112. In this case, thermal bridges 114 are arranged from outer layer 110 to outer layer 110. The thermal bridges 114 are in this case composed of a thermally conductive material which in particular has a metal content. For example, the thermal bridges 114 are formed from an at least partially metallic thread or metal wire. The thermal bridges 114 penetrate the outer layers 110 and the core 112 and connect both in a thermally conductive manner. The thermal bridges 114 are introduced into the outer structure 106 for example by way of a sewing process. Here, the outer layers 110 may also be upgraded for heat conduction.

According to one exemplary embodiment for inserts in which an aluminum honeycomb 112 is not desired, the floor panel 106 is produced with a sandwich construction in which thermal bridges 114 in the form of thermally conductive threads 114 are sewn in in the thickness direction, said threads connecting the upper outer layer 110 of the sandwich composite 106 to the lower outer layer 110 in a thermally conductive manner. The threads 114 may exhibit increased thermal conduction for example as a result of a silver content in the threads 114. Also, it is possible for pure-metal threads 114 to be used. Such a panel 106 may be produced in an infusion process. In this case, during the infusion, the resin runs along the threads 114 in order for the latter to be embedded into resin again and thus, electrically, completely insulated.

In one exemplary embodiment, the thermal bridges 114 are subjected to tensile force and are cut into the outer layers 110 in order to obtain an even surface of the outer structure 106.

In one exemplary embodiment, the resistance material 108 of the heater 104 is applied to a flexible film 116. The film 116 is adhesively bonded to the support structure 102. Due to the flexible film 116, the material 108 is not subject to obstruction in terms of its thermal expansion.

A contacting plane 118 is arranged on a side of the resistance material 108 which is opposite the film 116. Here, both electrical contacts are arranged on the same side of the resistance material 108.

Figure 2:
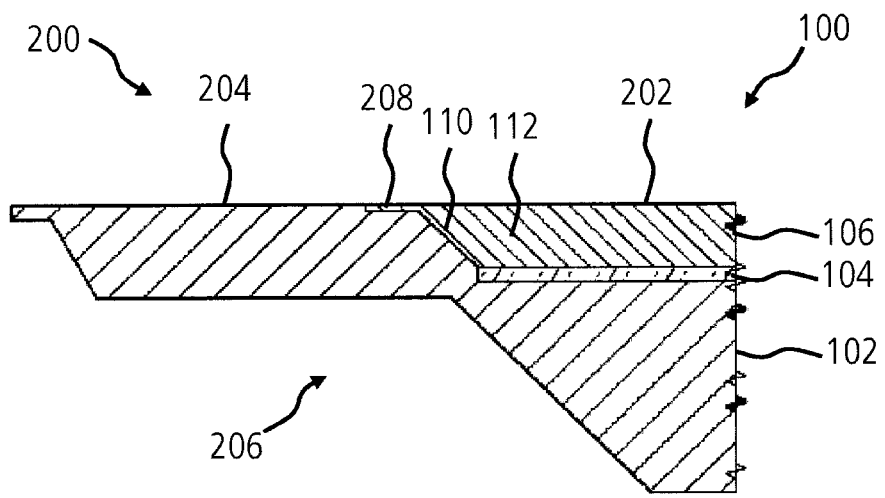
FIG. 2 shows a partial sectional illustration of a floor panel with a heating device according to one exemplary embodiment.

FIG. 2 shows a partial sectional illustration of a floor panel 200 with a heating device 100 according to one exemplary embodiment. In other words, FIG. 2 shows a sectional sketch of the individual layers by way of example. Here, the heating device 100 substantially corresponds to the heating device in FIG. 1. Here, the heater 104 and the outer structure 106 are arranged in a recess of the support structure 102. The recess and the outer structure 106 have in this case inversely matching bevelled edges at which the outer structure 106 bears on the support structure. A surface of the outer structure 106 forms a tread surface 202 of the floor panel 200. The support structure 102 has in an edge region 204 a bearing point 206 for placing the floor plate 200 on a frame (not illustrated). The bearing point 206 is likewise designed with bevelled edges.

The edge region 204 is designed as a flange having a small thickness. The flange 204 extends in a main direction of extent of the floor panel 200. According to one exemplary embodiment, the outer structure 106 is designed with thermal bridges in order to improve the thermal conduction between the heater 104 and the tread surface 202.

In one exemplary embodiment, the heater 104 is arranged in a floating manner between the outer layer 106 and the support structure 102. In this way, the heater 104 can expand without obstruction during warming and can contract without obstruction during cooling. For example, it is possible for a film with a small coefficient of friction to be arranged between the support structure 102 and/or the outer layer 106 and the heater 104.

In one exemplary embodiment, the outer layer 106 is designed as a laminate with outer layers 110. Here, the outer layers 110 project beyond the core 112 in an edge region 208 and are connected to one another in a fluid-tight manner.

In order to avoid moisture infiltrating into the floor panel, the panel 106 has a closed construction all the way around. This means that during the production, the lower outer layer 110 is led to the upper outer layer 110 and cohesively connected during the curing process. Consequently, it is no longer possible for moisture to infiltrate from the edge region, which, in the case of conventional panels, is sealed by so-called edge filling compound. At a place where connection is carried out at a later stage, that is to say adhesively, full-area sealing is realized, with the result that, here too, moisture can no longer infiltrate.

Figure 3:
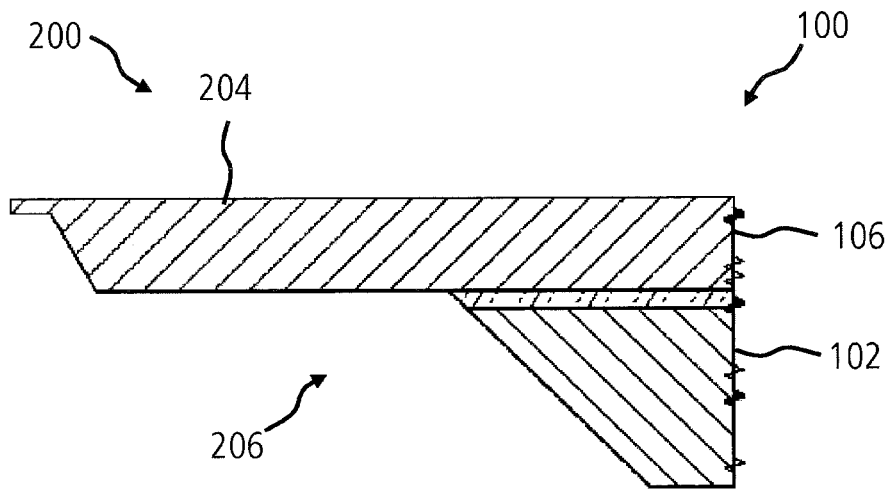
FIG. 3 shows a further partial sectional illustration of a floor panel with a heating device according to one exemplary embodiment.

FIG. 3 shows a further partial sectional illustration of a floor panel 200 with a heating device 100 according to another exemplary embodiment. The floor panel 200 substantially corresponds to the floor panel in FIG. 2. In contrast to this, the flange 204 is formed by the outer structure 106. The outer structure 106 becomes the support structure in this case and projects beyond the lower part of the panel, which has become the insulating structure 102 and makes only a small contribution to the stiffness and strength of the total arrangement, in the edge region 204. Here, the bearing point 206 is formed by the outer structure 106. According to one exemplary embodiment, the outer structure is in this case formed such that the edge regions are not closed as illustrated in FIG. 2, but are closed off by a movement of edge filling compounds into which it is possible for the inserts for the screw connection of the panel to the bearing point 206 to be already integrated.

Figure 4:
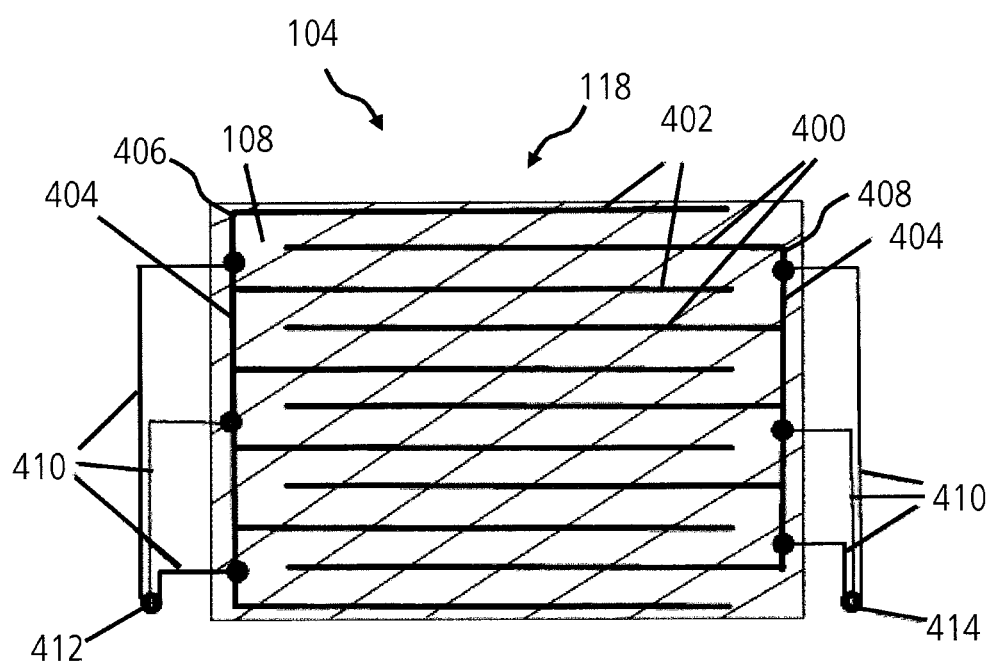
FIG. 4 shows an illustration of a heater according to one exemplary embodiment.

FIG. 4 shows an illustration of a heater 104 according to one exemplary embodiment. The heater 104 substantially corresponds to one of the heaters illustrated in FIGS. 1 to 3. The heater 104 has a planar layer composed of a resistance material 108 having an electrical resistance with a positive temperature coefficient. In this case, the electrical resistance of the resistance material 108 increases with increasing temperature and, for the same electrical voltage, less electrical current flows through the layer, this reducing a power consumption of the heater 104.

According to an exemplary embodiment, the layer formed from the resistance material 108 has a width and a length of in each case at least 4 cm. Thus, the resistance material 108 is, according to one embodiment, not used in the form of wires or narrow strips, but as a planar layer with an area of for example at least 20 cm$^2$.

On the layer composed of resistance material 108 there are, in the contacting plane 118, parallel conductor tracks 400, 402 arranged in a uniformly distributed manner. Adjacent conductor tracks 400, 402 are electrically insulated from one another. Every second conductor track 400, 402 is electrically interconnected by way of a current collector 404. The conductor tracks 400, 402 and current collectors 404 form interdigital electrodes 406, 408 on the layer composed of resistance material 108.

Here, the current collectors 404 are each electrically contacted at three different points and connected to electrical connections 412, 414 of the heater 104 via separate conductors 410. Due to the separate conductors 410, the contacting is redundant and a function of the heater 104 is ensured even when two of the conductors 410 or a current collector 404 are interrupted.

The first conductor tracks 400 and the second conductor tracks 402 are arranged adjacent to one another in an alternating manner such that the conductor tracks 400, 402 engage into one another in a finger-like manner. According to one exemplary embodiment, each interdigital electrode 406, 408 has at least three first conductor tracks 400 and at least three second conductor tracks 402.

In other words, FIG. 4 shows a PTC heater 104 with an electrically conductive finger structure 118. The contacting of the resistance material 108, which, according to one exemplary embodiment, is designed in the form of a PTC layer or PTC heating lacquer, is realized by way of an electrically conductive finger structure 400, 402 with current collection regions 404, which are applied directly to the resistance material 108. The finger structure 400, 402 and the current collection regions 404 may be produced by application of a conductive lacquer or by adhesion of punched-out or etched conductor films.

For the purpose of reducing the effect of punctiform damage of the heater plane, the current collection regions 404 are multiply connected to the electrical connection points 412, 414.

The heating power of the heating element 104 constructed in this manner results from the specific surface resistance of the heating lacquer 108, the applied thickness of the resistance material 108, for example in the form of a heating lacquer, and the distance to the electrically conductive finger structure 400, 402, and is thus adaptable to the heating power requirements.

Figure 5A:
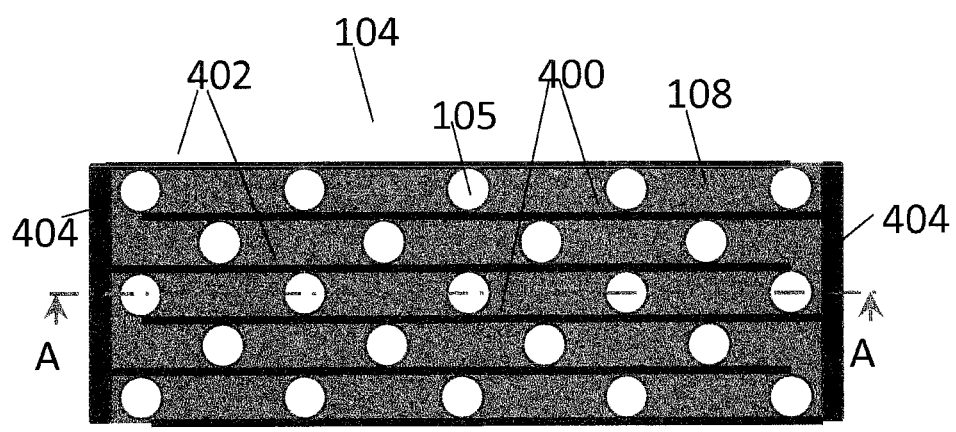
FIG. 5a shows an illustration of a heater according to one exemplary embodiment.
Figure 5B:
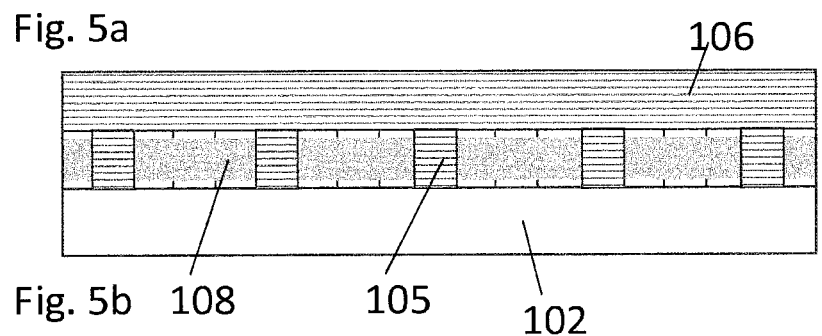

FIG. 5a shows an illustration of a heater 104 according to a further exemplary embodiment of the present invention. The heater 104 substantially corresponds to one of the heaters illustrated in FIGS. 1 to 3. The heater 104 has a planar layer composed of a resistance material 108 having an electrical resistance with a positive temperature coefficient. As opposed to the heating layer according to FIG. 4, the heating layer has circular perforations 105. The perforations are formed such that cavities are produced between the outer structure 106 and the support structure 102, as can be seen in FIG. 5b. Said cavities are filled with an adhesive, with the result that mechanical decoupling between the heating layer and the outer and support structures is provided.

Figure 6:
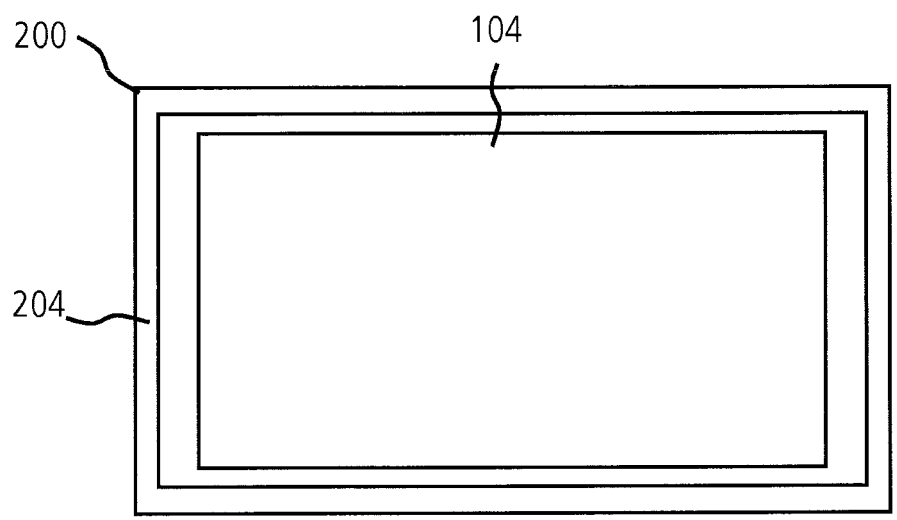
FIG. 6 shows an illustration of a floor panel for an aircraft interior according to one exemplary embodiment.

FIG. 6 shows an illustration of a floor panel 200 for an aircraft interior according to one exemplary embodiment. Here, the floor panel 200 substantially corresponds to the floor panels illustrated in FIGS. 2 and 3. The floor panel 200 is rectangular. The edge region 204 is designed so as to run around the floor panel 200. The heater 104 is arranged centrally in the floor panel and is smaller in size than a total area of the floor panel 200.

A construction of a damage-tolerant, heatable floor panel 200 for aircraft (FPH, "floor panel heated") is proposed. The approach proposed here is generally able to be used for areal heating. In this case, the heating of the floor panel 200 is realized by a PTC-technology heater 104. The floor panel 200 has an innovative panel construction for reducing damage.

A PTC material, as a resistance material, has a positive temperature coefficient. Heater materials having this property possess inherent temperature-limiting properties in that the electrical resistance increases with increasing temperature and, as a result, the consumed electrical power is reduced with increasing temperature.

The increase in the damage tolerance and the reduction of heater failure in the floor panel lead to an increase in reliability in the context of operational reliability.

Proposed is the construction of a heatable floor panel 200, as is provided for example in aircraft in the region of the entrance doors and the galleys (kitchens), in order, there, to heat in the floor region those regions which are reached less easily by the cabin heating system.

The heating primarily, but not exclusively, serves the purpose of creating a pleasant climate for cabin personnel who stand in the galley region and sit on so-called cabin attendant seats in the region of the exits.

In the approach proposed here, the construction of the heatable panels 200 is realized such that a certain damage tolerance with regard to the types of damage hitherto observed is established. Causes of damage are for example mechanical loads acting in a punctiform manner, environmental influences such as moisture and humidity or air-pressure and temperature cycles.

For the purpose of avoiding overheating due to failure or malfunctioning of regulating elements, use is made of an, as it were, self-limiting heating element 104 with PTC technology, in which the electrical internal resistance of the heating element 104 increases with increasing temperature and, consequently, the current or the temperature is limited even without external regulating monitoring means.

In this case, this is produced such that a certain flexibility of the heating element 104 is achieved in that a PTC lacquer or a spreadable PTC compound is applied to a flexible film as a layer.

The PTC heating element 104 is arranged so as to be able to expand freely in a manner dependent on the temperature. In this way, the PTC effect is promoted. Here, the heating element 104 is not connected directly and rigidly to the fiber-reinforced laminate 102 because the latter would obstruct the thermal expansion. For the free expandability, it is possible for the heating element 104 to be embedded in either a slide plane or an elastic plane.

For avoiding mechanical influences on the heating function of the floor panel 200, a construction is introduced, whereby mechanical damage of the upper side does not necessarily lead to the immediate failure of the heating element 104.

This is achieved in that the active heating element 104 is arranged not at one of the upper outer layers, but at a depth of the floor panel 200. Arranged above the heating element 104 in this case is a laminate, or a sandwich structure, which for its part is upgraded to conduct the heat from the heating element 104 to the surface of the floor panel 200. Consequently, the laminate or the sandwich structure above the heating element 104 can sustain damage without the heating element 104 being directly affected.

In other words, a floor panel 200 with a heating device 104 for use primarily, but not exclusively, in aircraft cabins is proposed. The heat emitted by the heating device 104 is transported to the surface due to the thermally conductive property of the panel construction. To this end, use is made of a laminate or sandwich construction above the heater 104. Alternatively, above the heater, use is made of an outer laminate or an outer laminate with core material, which, with regard to the heat conduction, is optimized or has been optimally selected and thus has a damage tolerance with respect to mechanical influences.

In one exemplary embodiment, the panel is formed to counter infiltration of moisture such that no electrically active parts can be reached by the moisture.

In one exemplary embodiment, the at least one electrical heater 104 has a PTC characteristic for temperature self-limitation.

In one exemplary embodiment, the electrical contacting of the PTC surface is designed such that individual punctiform damage does not lead to the complete failure of the heater.

Figure 7:
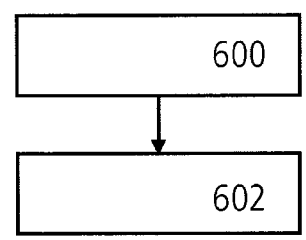
FIG. 7 shows a flow diagram of a method for producing a heating device according to one exemplary embodiment.

FIG. 7 shows a flow diagram of a method for producing a heating device according to one exemplary embodiment. The method has a step 600 of provision and a step 602 of arrangement. In step 600, a mechanically loadable support structure and a mechanically loadable and thermally conductive outer structure are provided. In step 602, a heater is arranged between the support structure and the outer structure. For example, in step 602, a resistance material of the heater is applied in liquid or spreadable form to a surface of the support structure and/or of the outer structure.

If an exemplary embodiment comprises an "and/or" conjunction between a first feature and a second feature, this should be read to mean that the exemplary embodiment, according to one embodiment, has both the first feature and the second feature, and, according to a further embodiment, has either only the first feature or only the second feature.

What is claimed is:

1. A heating device for an aircraft interior, having the following features:
    a mechanically loadable support structure;
    a mechanically loadable and thermally conductive outer structure; and
    a heater for converting electrical energy into thermal energy, wherein the heater is arranged between the support structure and the outer structure and has a heating layer composed of a resistance material with a positive temperature coefficient,
    wherein the heating layer has perforations at least regionally,
    wherein, as a result of the perforations, there are provided fillable cavities between the support structure and the outer structure,
    wherein the heating layer includes conductor tracks and wherein the perforations are provided between the conductor tracks, and
    wherein adhesive is provided in the fillable cavities provided by the perforations, such that the fillable cavities are completely filled with the adhesive.

2. The heating device as claimed in claim 1, in which a surface of the outer structure is formed as a tread surface of a floor panel.

3. The heating device as claimed in claim 1, in which the outer structure is a laminate composed of a core between two outer layers, wherein the core is a honeycomb core composed of a metal material.

4. The heating device as claimed in claim 3, in which a surface of the honeycomb core has protection against corrosion.

5. The heating device as claimed in claim 1, in which the outer structure is a laminate composed of a core between two outer layers, wherein the core is composed of a thermally insulating material and the outer layers are connected through the core by thermally conductive thermal bridges.

6. The heating device as claimed in claim 5, in which the thermal bridges are realized by at least one thread sewn into the core.

7. The heating device as claimed in claim 5, in which the thermal bridges are additionally realized by modified matrix material.

8. The heating device as claimed in claim 3, in which the outer layers are connected directly to one another in a peripheral edge region.

9. The heating device as claimed in claim 1, in which the heater is connected to the support structure and/or the outer structure through the use of an elastic or slide-plane material.

10. The heating device as claimed in claim 1, in which the support structure and the outer structure are connected to one another at least sectionally in an edge region and the heating layer composed of the resistance material is arranged in a floating manner between the support structure and the outer structure.

11. The heating device as claimed in claim 1, in which the heating layer composed of the resistance material is enclosed in a fluid-tight manner between the support structure and the outer structure.

12. The heating device as claimed in claim 1, in which the heating layer composed of the resistance material is a layer applied from a liquid or spreadable resistance material to the support structure or the outer structure.

13. A method for producing a heating device for an aircraft interior, wherein the method has the following steps:
provision of a mechanically loadable support structure and a mechanically loadable and thermally conductive outer structure; and
arrangement of a heater, serving for converting electrical energy into thermal energy, between the support structure and the outer structure, wherein the heater has a heating layer composed of a resistance material with a positive temperature coefficient,
wherein the heating layer has perforations at least regionally,
wherein, as a result of the perforations, there are provided fillable cavities between the support structure and the outer structure,
wherein the heating layer includes conductor tracks and wherein the perforations are provided between the conductor tracks, and
wherein adhesive is provided in the fillable cavities provided by the perforations, such that the fillable cavities are completely filled with the adhesive.

14. The heating device as claimed in claim 1, wherein the perforations extend from the outer structure to the support structure, such that the perforations provide a mechanical decoupling between the heating layer and the outer structure and between the heating layer and the support structure.

* * * * *